United States Patent
Ohkubo

(10) Patent No.: US 7,136,187 B1
(45) Date of Patent: Nov. 14, 2006

(54) COLOR CORRECTING RELATION EXTRACTING METHOD AND COLOR CORRECTION METHOD

(75) Inventor: Akito Ohkubo, Kanagawa (JP)

(73) Assignee: Fuji Photo Film Co., Ltd, Kanagawa (JP)

(*) Notice: Subject to any disclaimer, the term of this patent is extended or adjusted under 35 U.S.C. 154(b) by 1018 days.

(21) Appl. No.: 09/631,730

(22) Filed: Aug. 3, 2000

(30) Foreign Application Priority Data

Aug. 4, 1999 (JP) ................. 11-220781

(51) Int. Cl.
*G06F 15/00* (2006.01)
*G03F 3/08* (2006.01)
*G06K 9/00* (2006.01)

(52) U.S. Cl. .................. 358/1.9; 358/518; 382/167

(58) Field of Classification Search .......... 358/1.9, 358/2.1, 3.23, 3.24, 501, 518, 520, 525, 529, 358/500, 504, 521; 382/167, 162

See application file for complete search history.

(56) References Cited

U.S. PATENT DOCUMENTS

| | | | | |
|---|---|---|---|---|
| 5,200,832 A * | 4/1993 | Taniuchi et al. | ............ | 358/300 |
| 5,218,671 A * | 6/1993 | Liao et al. | ................... | 345/595 |
| 5,223,891 A * | 6/1993 | Fierstein et al. | .............. | 355/77 |
| 5,333,069 A * | 7/1994 | Spence | ........................ | 358/517 |
| 5,463,480 A * | 10/1995 | MacDonald et al. | ........ | 358/520 |
| 5,481,655 A * | 1/1996 | Jacobs | ........................ | 358/1.9 |
| 5,483,360 A * | 1/1996 | Rolleston et al. | ........... | 358/518 |
| 5,539,540 A * | 7/1996 | Spaulding et al. | .......... | 358/518 |
| 5,619,427 A * | 4/1997 | Ohkubo | ...................... | 358/523 |
| 5,712,925 A * | 1/1998 | Ohga | .......................... | 382/167 |
| 5,734,801 A * | 3/1998 | Noguchi et al. | ............. | 358/1.9 |
| 5,781,709 A * | 7/1998 | Usami et al. | ................ | 358/1.9 |
| 5,828,781 A * | 10/1998 | Nakano | ....................... | 382/167 |
| 5,852,675 A * | 12/1998 | Matsuo et al. | ............. | 382/167 |
| 6,023,527 A * | 2/2000 | Narahara | ..................... | 382/167 |
| 6,072,588 A * | 6/2000 | Dohnomae | .................. | 358/1.9 |
| 6,075,614 A * | 6/2000 | Ohtsuka et al. | ............. | 358/1.1 |
| 6,172,681 B1 * | 1/2001 | Ueda | .......................... | 345/589 |
| 6,172,776 B1 * | 1/2001 | Murai et al. | ................ | 358/529 |
| 6,198,843 B1 * | 3/2001 | Nakauchi et al. | ........... | 382/167 |
| 6,229,916 B1 * | 5/2001 | Ohkubo | ...................... | 382/167 |
| 6,320,676 B1 * | 11/2001 | Yoshidome | ................. | 358/1.9 |
| 6,339,485 B1 * | 1/2002 | Yamada | ..................... | 358/504 |
| 6,480,622 B1 * | 11/2002 | Kim | ........................... | 382/162 |
| 6,522,425 B1 * | 2/2003 | Yoshidome | ................. | 358/1.9 |
| 6,539,169 B1 * | 3/2003 | Tsubaki et al. | ............. | 386/109 |
| 6,542,634 B1 * | 4/2003 | Ohga | .......................... | 382/167 |
| 6,549,653 B1 * | 4/2003 | Osawa et al. | ............... | 382/162 |
| 6,590,996 B1 * | 7/2003 | Reed et al. | .................. | 382/100 |
| 6,717,674 B1 * | 4/2004 | Ohkubo | ...................... | 356/421 |
| 6,727,999 B1 * | 4/2004 | Takahashi | .................. | 358/1.15 |
| 2004/0240728 A1 * | 12/2004 | Saikawa et al. | ............ | 382/162 |

* cited by examiner

*Primary Examiner*—Madeleine A V Nguyen
(74) *Attorney, Agent, or Firm*—Sughrue Mion, PLLC

(57) ABSTRACT

There are disclosed a color correcting relation extracting method capable of extracting a know-how of an image formation by a camera man, and a color correction method of reproducing the know-how. A color of a patch of a color chart is measured to obtain a colorimetry value, and the color chart is photographed by a television camera to obtain RGB data. A know-how for converting the colorimetry value into the RGB data is combined with a monitor characteristic conversion for converting the RGB data into the colorimetry value of a color of an image on a monitor, so that a know-how for a preferable image formation is obtained.

4 Claims, 4 Drawing Sheets

COLOR CORRECTING RELATION EXTRACTING METHOD AND COLOR CORRECTION METHOD

BACKGROUND OF THE INVENTION

1. Field of the Invention

The present invention relates to a color correcting relation extracting method for extracting the association among colors before and after color correction in the event that there is used an input device for receiving an original image to outputting image data representative of colors of a received image which is subjected to a color correction for the original image, and a color correction method for reproducing the color correction.

2. Description of the Related Art

In a technical field of printing, a photograph and the like, in the event that an original image on a reversal film is transferred onto a printing paper or a photographic paper to make a printed matter or a photograph, it often happens that an operator applies a color correction to form a high quality of image having the tone of a color, which is visually preferable for a person, on the printed matter or the photograph.

Hitherto, for forming such a high quality of image, there is use a specified system for producing a printed matter or a photograph to optimize the system in accordance with experience of an operator of the system.

For example, in case of the printing, when an original image on a reversal film is read by a scanner to derive image data, the image data is corrected through an operation of the scanner by the operator. An image is printed in accordance with the corrected image data, so that a preferable tone of color image is produced. At that time, a correction parameter for correcting the image data derived through the scanner is optimized in accordance with know-how based on the experience of an operator of the scanner, taking into consideration properties of the system in its entirety including printing papers, printing ink and the like. That is, a know-how of image formation, in which an image having a preferable tone of color is formed from an original image on a reversal film, is possessed by the operator of the scanner. Here, it is assumed that the operator of the scanner optimizes the correction parameter for a combination of a certain film and printing ink so that an image having a preferable tone of color is obtained. However, in the event that the film and/or the printing ink are replaced by other film and/or printing ink, the correction parameter will be changed to an inappropriate correction parameter. Thus, in this case, there is a need to optimize the correction parameter again.

On the other hand, in case of the photograph, a reversal film is loaded on a laboratory system and adjusted light for exposure is projected onto the loaded reversal film, so that a corrected image is obtained. The corrected image thus obtained is printed on a printing paper to form an image having a preferable tone of color. At that time, a balance among R light, G light and B light for the exposure and an exposure time are optimized by an operator of the laboratory system and an automatic control mechanism of the laboratory system, taking into consideration properties of the system in its entirety including films, a light source, printing papers and the like. Further, also with respect to a combination of a sort of a film and a sort of a printing paper, there is selected such an optimum combination that a preferable tone of color image can be obtained. That is, a know-how of image formation, in which an image having a preferable tone of color is formed, is possessed by the operator of the laboratory system, a maker of the laboratory system and a maker of the film. Here, it is assumed that an exposure time or the like is optimized for a combination of a certain film and a certain printing paper so that an image having a preferable tone of color is obtained. However, for example, in the event that the film is replaced by another film developed newly, the combination of the film and the printing paper and the exposure time will be inappropriate for the new film. Thus, also in this case, there is a need to optimize the exposure time and the like again.

Thus, in both the cases of the printing and the photograph, there is a need to do over again an optimization to form an image having a preferable tone of color, whenever a film and the like is replaced by a new type of one according to a development of products.

Further, recently, as digital technology advances, it is increased that a transfer of images is performed among different industries and media. For example, in the event that instead of distribution of printed papers, images of the printed matter appears in a home page of an internet, the image of the printed matter will be converted into an image of a television, which is not so related to the printing industry hitherto. Further, for example, it begins that one shot of an image photographed by a home video is printed out by a printer of a personal computer, or outputted on a printing paper for a photograph. In the event that such a transfer of images is performed, it is desired that a high quality of image having a preferable tone of color as mentioned above is obtained at the received end of the image. However, according to the prior art, the above-mentioned know-how is merely allowed to be used only in the individual industries such as the printing industry and the photographic industry, but is not allowed to be used in a different industry on a common basis.

SUMMARY OF THE INVENTION

In view of the foregoing, it is an object of the present invention to provide a color correcting relation extracting method capable of extracting the above-mentioned know-how, and a color correction method capable of reproducing the know-how.

To achieve the above-mentioned object, the present invention provides a color correcting relation extracting method comprising:

an image data obtaining step of obtaining image data outputted from an input device for receiving an original image and outputting the image data representative of a received image which is subjected to a color correction for the original image;

a first conversion step of converting the image data obtained by said image data obtaining step into coordinate values of a colorimetry color space describing a measured value of a color, corresponding to a color of an image obtained when the image based on the obtained image data is outputted from an output device for outputting the image based on the image data, in accordance with characteristics of an image output of the output device; and coordinates obtaining step for obtaining the coordinate values of the colorimetry color space corresponding to the color of the original image, said coordinates obtaining step being not restricted in sequence of the step to be executed, whereby an association between colors before and after the color correction is extracted.

Here, in the coordinates obtaining step, it is acceptable that a colorimetry value is obtained through a colorimetry of an original image, or alternatively an original image is written into a reversal film or the like in which a color characteristic is known beforehand, by means of a laser beam so as to offer a predetermined colorimetry value of color.

According to the color correcting relation extracting method of the present invention, coordinate values of the colorimetry color space corresponding to colors of the original image and the received image are obtained. This feature makes it possible to extract a know-how of the color correction independent of characteristics of image receipt by an input device and characteristics of image output by an output device.

In the color correcting relation extracting method according to the present invention as mentioned above, it is acceptable that said coordinates obtaining step includes a characteristic obtaining step of obtaining a characteristic value capable of being converted into the coordinate values of the colorimetry color space, corresponding to a color of the original image, and a second conversion step of converting the characteristic value obtained by the characteristic value obtaining step into the coordinate values of the colorimetry color space.

A colorimetry value of color of an image on a reversal film and a printing paper can be calculated in accordance with a property value such as dye density of the reversal film or the like and a color characteristic of the reversal film or the like. Accordingly, it is possible to extract a know-how in form of device-independence in such a manner that dye density or the like of the original image is derived and a colorimetry value is computed from the dye density or the like thus obtained.

To achieve the above-mentioned object, the present invention provides a color correction method comprising:

a color correction conversion definition producing step including a first partial step of obtaining image data outputted from an input device for receiving an original image and outputting the image data representative of a received image which is subjected to a color correction for the original image, a second partial conversion step of converting the image data obtained by said first partial step into coordinate values of a colorimetry color space describing a measured value of a color, corresponding to a color of an image obtained when the image based on the obtained image data is outputted from an output device for outputting the image based on the image data, in accordance with characteristics of an image output of the output device, and a third partial step for obtaining the coordinate values of the colorimetry color space corresponding to the color of the original image, whereby said color correction conversion definition producing step produces a color correction conversion definition defining an association between coordinate values of the colorimetry color space corresponding to colors before and after the color correction;

a first device conversion step of using a conversion definition according to characteristics of image receipt or image output by a first device for receiving an image to obtain image data or outputting an image based on image data, to convert coordinate values in a first color space describing image data for the first device into coordinate values of the colorimetry color space independent of the device;

a color correction conversion step of using the color correction conversion definition produced in said color correction conversion definition producing step to convert coordinate values of the colorimetry color space corresponding to colors before the color correction into coordinate values of the colorimetry color space corresponding to colors after the color correction; and a second device conversion step of using a conversion definition according to characteristics of image receipt or image output by a second device for receiving an image to obtain image data or outputting an image based on image data, to convert coordinate values of the colorimetry color space into coordinate values in a second color space describing image data for the second device, whereby the image data defined by the first color space is converted into image data defined by the second color space, said image data being representative of an image in which the color correction is applied to an image based on the image data defined by the first color space.

Here, it is acceptable that the respective steps of the first device conversion step, the color correction conversion step and the second device conversion step are sequentially carried out in the named order, or alternately they are carried out in form of a united conversion process in which those steps are united.

According to the color correction method according to the present invention, in the color correction conversion definition producing step, there is produced a color correction conversion definition corresponding to a know-how extracted independent of an input device and an output device. And in the image data conversion step, the color correction conversion definition is used to convert the image data. This feature makes it possible to reproduce the color correction regardless of the sort of an input device and an output device.

In the color correction method according to the present invention as mentioned above, it is acceptable that said color correction conversion definition producing step produces, as said color correction conversion definition, a color correction conversion definition defining an association between coordinate values within an area of original image colors reproducible as colors of the original image of the colorimetry color space and coordinate values within an area of reproduced image colors reproducible as colors of the reproduced image of the colorimetry color space, before execution of the color correction conversion step, there is carried out a first gamut conversion step in which coordinate values within an area of colors reproducible as colors of an image received or outputted by the first device of the colorimetry color space are converted into coordinate values within the area of the original image colors, and after execution of the color correction conversion step, there is carried out a second gamut conversion step in which coordinate values within the area of the reproduced image color are converted into coordinate values within an area of colors reproducible as colors of an image received or outputted by the second device of the colorimetry color space.

Or alternatively it is acceptable that said color correction conversion definition producing step produces, as said color correction conversion definition, a color correction conversion definition defining an association between coordinate values within a predetermined area of the colorimetry color space, before execution of the color correction conversion step, there is carried out a first gamut conversion step in which coordinate values within an area of colors reproducible as colors of an image received or outputted by the first device of the colorimetry color space are converted into the coordinate values within the predetermined area, and after execution of the color correction conversion step, there is carried out a second gamut conversion step in which the coordinate values within predetermined area are converted into coordinate values within an area of colors reproducible as a colors of an image received or outputted by the second device of the colorimetry color space.

The adoption of the gamut conversion steps makes it possible to reproduce the know-how of the color correction so that the color reproducing ability of the first device and the second device are sufficiently derived.

DETAILED DESCRIPTION OF PREFERRED EMBODIMENTS

Embodiments of the present invention will be described with reference to the accompanying drawings.

Figure 1:
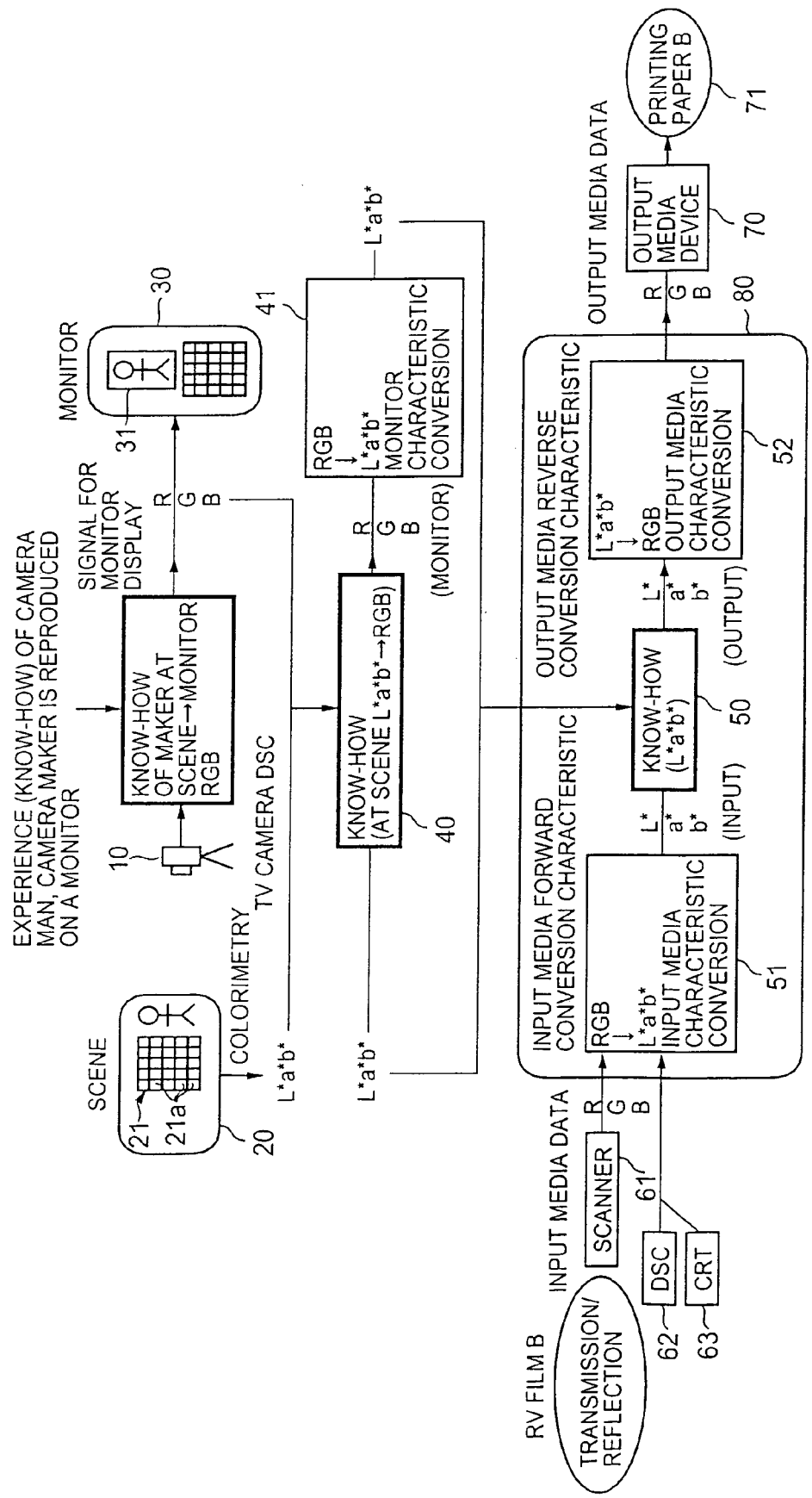
FIG. 1 is a view showing a first embodiment of a color correction method according to the present invention including a first embodiment of a color correcting relation extracting method according to the present invention.

FIG. 1 is a view showing a first embodiment of a color correction method according to the present invention including a first embodiment of a color correcting relation extracting method according to the present invention.

A first embodiment of a color correcting relation extracting method according to the present invention is related to a method of extracting a know-how for an image formation possessed by a camera man of a television camera and a digital still camera 10 and a camera maker. A first embodiment of a color correction method according to the present invention is related to a method in which the know-how is extracted in accordance with the first embodiment of a color correcting relation extracting method and the extracted know-how is used to perform a color correction.

According to the first embodiment of a color correcting relation extracting method, first, a scene 20 such as a person and a landscape is photographed by the television camera and the digital still camera 10 to obtain digital image data RGB. When the digital image data RGB is inputted to a monitor 30, an image 31 such as a portrait and a landscape is displayed on the monitor 30. To photograph the scene 20, a camera man controls a photographic condition such as an illumination way and the use of filter so that an image having a preferable tone of color is displayed on the monitor 30, through imaging a tone of color of the image 31 to be displayed on the monitor 30 or confirming the tone of color of the image 31 on the monitor 30. Consequently, a know-how for a color correction to obtain an image having a preferable tone of color is united with a basic operation for a scene photograph, and thus it is difficult to obtain image data before and after the color correction.

The scene 20, which includes a color chart 21 consisting of a number of monochromatic patches 21a arranged on a two-dimensional basis, is also photographed on the same photographic condition as that on which the scene 20 such as a person and a landscape is photographed. And RGB data associated with each of the patches 21a is derived from a signal for monitor display.

Next, a color of each of the patches 21a constituting the color chart 21 of the scene 20 is measured by a colorimeter to derive a measured value corresponding to coordinate values of a color space on a color of each of the patches 32a and 42a. As the measured value, CIEXYZ values, CIELUV values L*u*v*, and CIELAB values L*a*b* may be considered. Here, it is assumed that the CIELAB values L*a*b* are derived. Hereinafter, the CIELAB values L*a*b* are summarized as Lab. Further, in some case, it happens that the CIELAB values L*a*b* are referred to as coordinate values of a CIELAB color space.

In this manner, the Lab and RGB data are derived for each patch. Thus it is possible to obtain a know-how for converting the CIELAB values Lab of a color of the scene 20 into RGB data RGB (monitor) for the monitor 30. The know-how thus obtained corresponds to one in which a know-how for an image formation by the above-mentioned camera man and the like is extracted, but depends on color characteristics of the monitor 30.

For this reason, a know-how 40 for converting the CIELAB values Lab of a color of the scene 20 into RGB data RGB (monitor) for the monitor 30 is coupled to a monitor characteristic conversion 41 for converting the RGB data for the monitor 30 into the coordinate values Lab corresponding to the color of the image on the monitor in accordance with color characteristics of the monitor 30, so that there is obtained a know-how for a color correcting conversion to convert the coordinate values Lab within the CIELAB color space. Thus, there is generated a Look Up Table (LUT) 50 for defining the color correcting conversion. The LUT 50 thus generated is an example of the color correcting conversion definition referred to in the present invention, and correspond to one in which the know-how of the camera man and the like is extracted independently of the color characteristics of the monitor 30 and the like.

Here, the color characteristics of the monitor 30 can be obtained in such a manner that the RGB data is fed to the monitor 30, for example, by 10 such as 0, 10, 20, 30, . . . , and a color of an image to be displayed on the monitor 30 in accordance with the associated RGB data is measured.

In this manner, according to the first embodiment of a color correcting relation extracting method, there is produced the LUT 50 corresponding to a know-how independent of color characteristics of the monitor 30. However, the color correcting conversion definition referred to in the present invention is regardless of type thereof. Any one is acceptable, as the LUT, which defines a conversion corresponding to the know-how, for example, a function equation and a matrix. Hereinafter, the explanation will be continued assuming that the LUT is used to extract the know-how.

According to the first embodiment of the color correction method, first, the LUT 50 is generated in accordance with the first embodiment of a color correcting relation extracting method, and incorporated into the computer system 80.

The computer system 80 receives input media data derived through reading by a scanner 61 an image formed on an input media such as a reversal film, and a reflection print (for example a photograph), input media data representative of a color of an image photographed by a digital still camera 62, and input media data representative of a color of an image produced and edited on a CRT display 63. As a format of the input media data, there may be considered CMY data and RGB data. Here it is assumed that RGB data is inputted.

Next, there is performed an input media characteristic conversion in which entered RGB data is converted into coordinate values Lab (Input) of the CIELAB color space corresponding to the color of the image on the input media. The input media characteristic conversion is defined by an input media characteristic conversion definition 51 based on characteristics of the devices 61, 62 and 63 associated with the entered RGB data.

Then, the LUT 50 converts the coordinate values Lab (Input) to coordinate values Lab (Output) corresponding to a preferable tone of color.

Finally, the coordinate values Lab (Output) derived through conversion by the LUT 50 are converted into the RGB data for an output device 70 such as a digital printer in accordance with an output media characteristic conversion defined by an output media characteristic conversion definition 52 based on output characteristics of the output device 70. The output device 70 outputs an image to an output media 71 such as a printing paper. Here, as the output media 71, other than the printing paper, there are considered a printed matter, a CRT display and a reversal film.

When the RGB data thus outputted is fed to the output device 70, an image having a preferable tone of color is produced on the output media 71. The know-how for a color correction to obtain an image having such a preferable tone of color may be reproduced regardless of input and output characteristics of the input devices 61, 62 and 63 and the output device 70. In other words, it is possible to implement a wide use of color correction system independent of the input devices and the output device.

Figure 2:
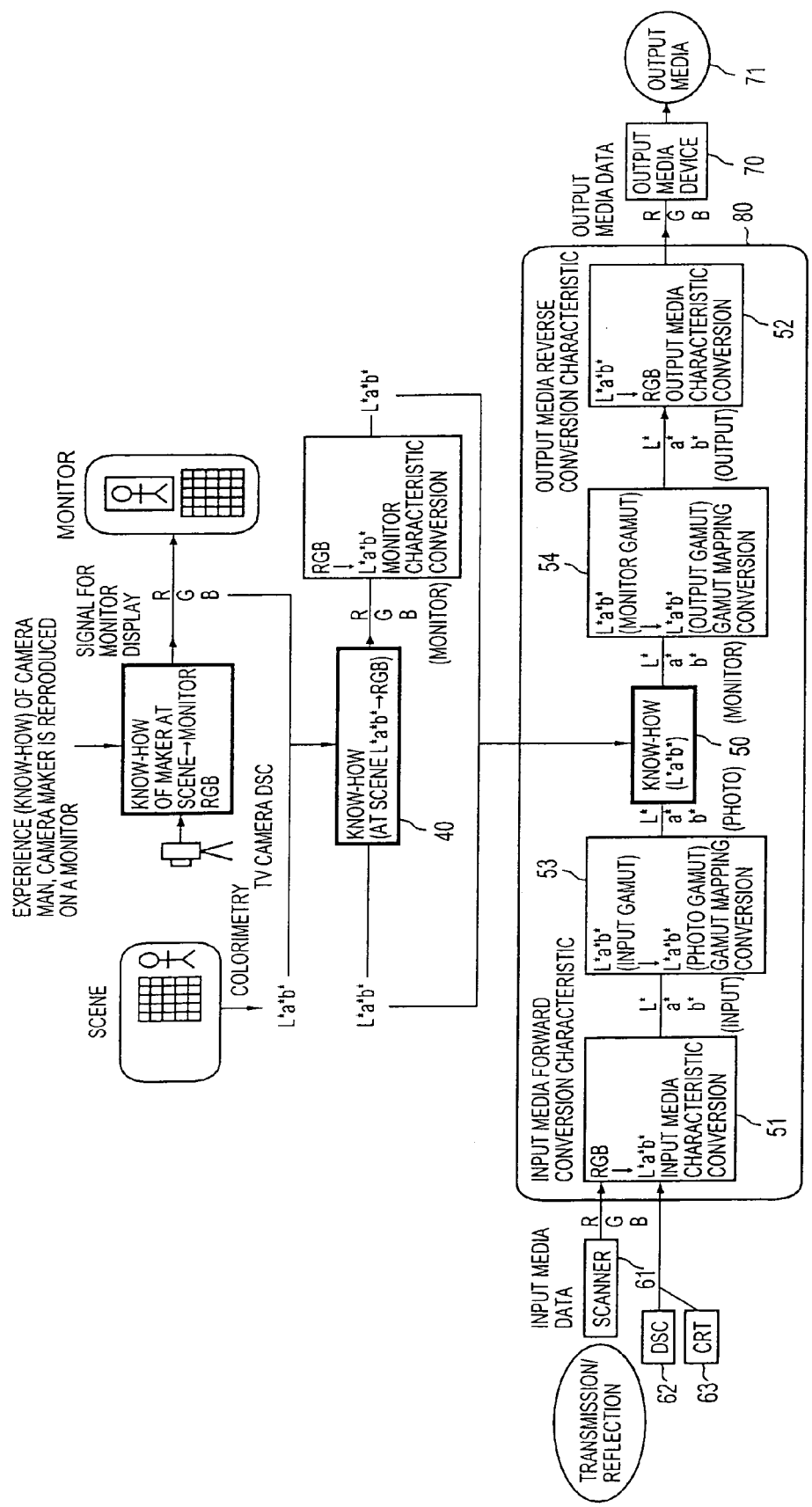
FIG. 2 is a view showing a second embodiment of a color correction method according to the present invention including a first embodiment of a color correcting relation extracting method according to the present invention.

FIG. 2 is a view showing a second embodiment of a color correction method according to the present invention including a first embodiment of a color correcting relation extracting method according to the present invention.

With respect to the first embodiment of a color correcting relation extracting method according to the present invention, the redundant description will be omitted.

Also in the second embodiment of a color correction method, as mentioned above, after the LUT 50 is produced and incorporated into the computer system 80, input media data (RGB data) for the input devices 61, 62 and 63 are inputted to the computer system 80. And the RGB data fed to the computer system 80 is converted into coordinate values Lab (Input) of the CIELAB color space corresponding to the color of the image on the input media in accordance with the input media characteristic conversion defined by the above-mentioned input media characteristic conversion definition 51 based on characteristics of the input devices 61, 62 and 63 associated with the entered RGB data.

By the way, the coordinate values Lab (Input) are coordinate values within a color reproducing area of the input devices associated with the RGB data on the CIELAB color space fed to the computer system 80. On the other hand, the LUT 50 incorporated into the computer system 80 is produced by the above-mentioned first embodiment of a color correcting relation extracting method. Accordingly, the LUT 50 is to associate the coordinate values within a color reproducing area capable of being photographed by the above-mentioned television camera 10 and the like with the coordinate values within a color reproducing area of the monitor 30. Hereinafter, the color reproducing area capable of being photographed by the above-mentioned television camera 10 and the like is referred to as a photographic color reproducing area.

In the event that the coordinate values Lab (Input) are converted by the LUT 50 in the present form, there is a possibility of occurrence of such an inconvenience that the know-how for the color correction is not reproduced, owing to the fact that the color reproducing area of the input devices 61, 62 and 63 is different from the photographic color reproducing area.

For this reason, according to the second embodiment of a color correction method, there is performed a gamut mapping conversion in which coordinate values within a certain color reproducing area (gamut) are converted into coordinate values within another color reproducing area (gamut), in a state that an impression of a color of an image is maintained. The gamut mapping conversion is a reversible conversion and also a conversion that two color reproducing areas are associated with one another in their entirety. The computer system 80 incorporates thereinto a LUT type of gamut conversion definition defining the gamut mapping conversion.

The coordinate values Lab (Input) obtained through the above-mentioned input media characteristic conversion is subjected to a gamut mapping conversion in which coordinate values Lab (Input) within a color reproducing area of the input devices 61, 62 and 63 are converted into coordinate values Lab (photograph) within the photographic color reproducing area. The gamut mapping conversion is defined by a gamut conversion definition 53. Thus, it is possible to avoid an inconvenience due to a difference between the color reproducing area of the input devices 61, 62 and 63 and the photographic color reproducing area.

Next, the coordinate values Lab (photograph) within the photographic color reproducing area are converted by the LUT 50 into the coordinate values Lab (monitor) within a color reproducing area of the monitor 30, which corresponds to a preferable tone of color.

Next, in a similar reason to that of the adoption of the gamut mapping conversion defined by the gamut conversion definition 53, there is performed a gamut mapping conversion in which coordinate values Lab (monitor) within a color reproducing area of the monitor 30 are converted into coordinate values Lab (Output) within a color reproducing area of the output device 70. This gamut mapping conversion is defined by a gamut conversion definition 54.

Finally, the coordinate values Lab (Output) is converted into the RGB data for the output device 70 in accordance with an output media characteristic conversion.

Figure 3:
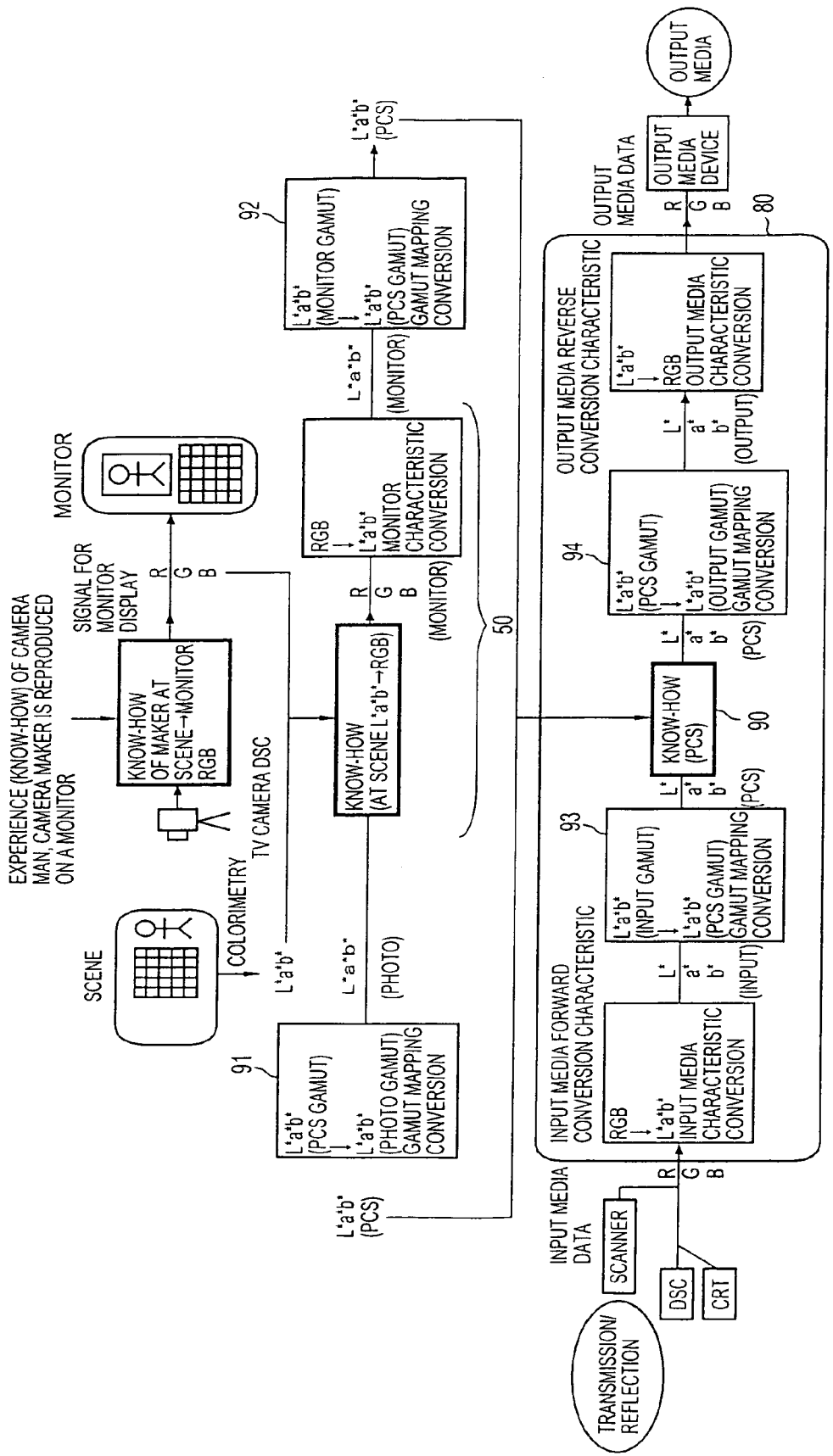
FIG. 3 is a view showing a third embodiment of a color correction method according to the present invention including a first embodiment of a color correcting relation extracting method according to the present invention.

FIG. 3 is a view showing a third embodiment of a color correction method according to the present invention including a first embodiment of a color correcting relation extracting method according to the present invention.

With respect to the first embodiment of a color correcting relation extracting method according to the present invention, the redundant description will be omitted.

As mentioned above, the know-how 50, which is extracted in accordance with first embodiment of a color correcting relation extracting method, serves to associate the coordinate values within the photographic color reproducing area with the coordinate values within the color reproducing area. And in the event that the LUT corresponding to the know-how 50 is incorporated into the computer system to be used for a color correction, as mentioned above, there is a need to prepare the gamut mapping conversion based on the photographic color reproducing area and the color reproducing area of the monitor 30.

However, in the event that it is aimed to establish a wide use of color correction system independent of the input devices and the output device, the process of the gamut mapping conversion based on the color reproducing area of the specific device such as the monitor 30 may bring about a fear that it would be an obstacle of a wide use of the system.

In view of the foregoing, according to the third embodiment of a color correction method, the know-how 50, which converts the coordinate values within the photographic color reproducing area into the coordinate values within the color reproducing area of the monitor 30, is modified to obtain a know-how for converting the coordinate values within a standard color reproducing area PCS and produce an LUT 90 corresponding to the know-how thus obtained. The LUT thus produced is incorporated into the computer system 80. That is, a gamut mapping conversion 91, in which coordinate values within the standard color reproducing area PCS are converted into coordinate values within the photographic color reproducing area, the know-how 50, in which the coordinate values within the photographic color reproducing area are converted into the coordinate values within the color reproducing area of the monitor, and a gamut mapping conversion 92, in which coordinate values within the color reproducing area of the monitor are converted into coordinate values within the standard color reproducing area PCS are united, and the LUT 90 corresponding to a united conversion, in which a series of conversions are united, is produced and incorporated into the computer system 80.

After the LUT 90 is incorporated into the computer system 80, a color correction is performed in an approximately similar way to the above-mentioned second embodiment of the color correction method. According to the third embodiment of the color correction method, instead of the gamut mapping conversions defined by the gamut conversion definitions 53 and 54 in the above-mentioned second embodiment of the color correction method, there are performed a gamut mapping conversion defined by the gamut conversion definitions 93 and 94 wherein coordinate values Lab (Input) within the color reproducing area of the input device are converted into coordinate values Lab (PCS) within the standard color reproducing area PCS, and a gamut mapping conversion defined by the gamut conversion definition wherein coordinate values Lab (PCS) within the standard color reproducing area PCS are converted into coordinate values Lab (Output) within the color reproducing area of the output device.

As a result, it is possible to implement a color correction system excellent in a wide use property.

Figure 4:
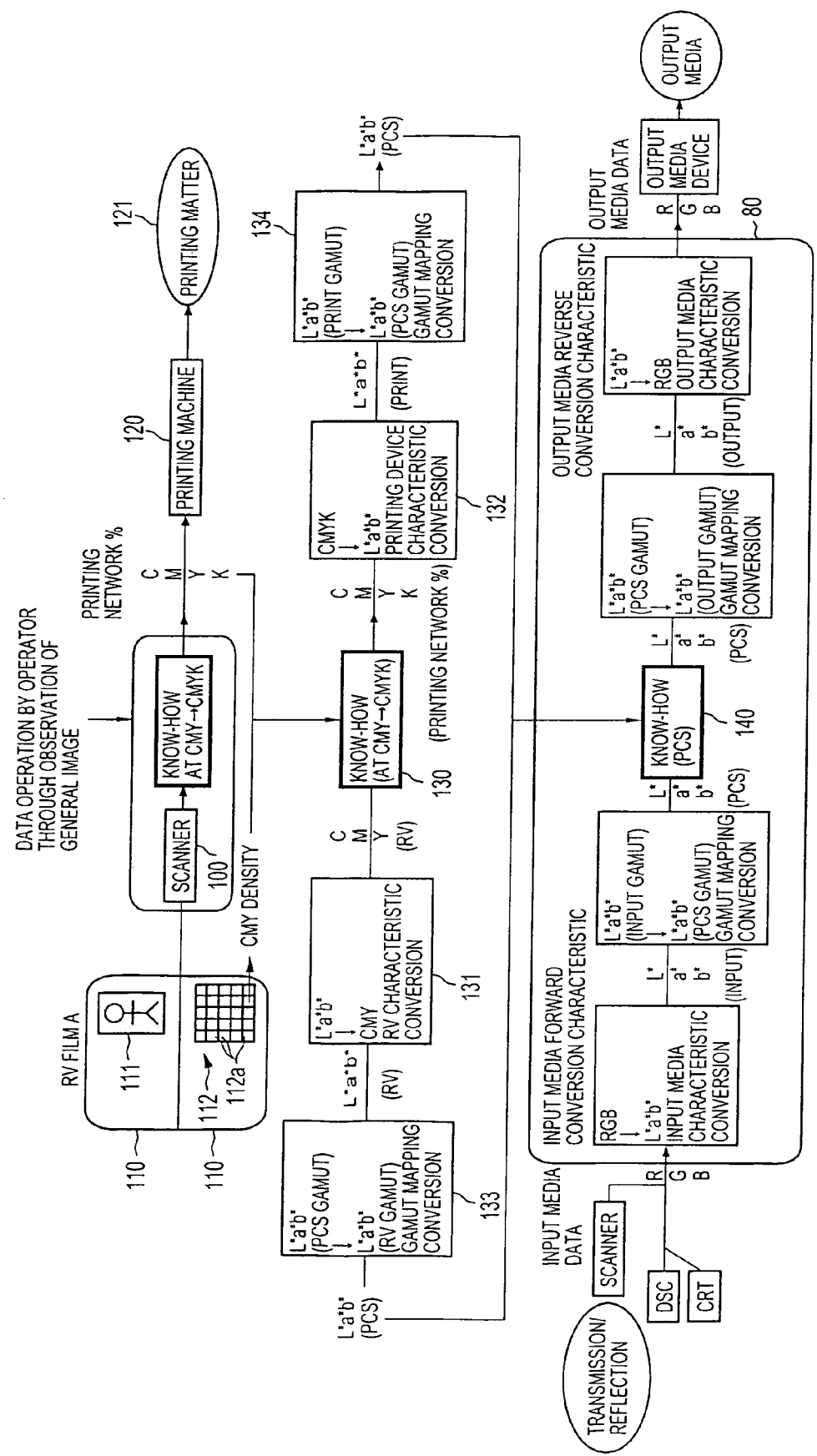
FIG. 4 is a view showing a fourth embodiment of a color correction method according to the present invention including a second embodiment of a color correcting relation extracting method according to the present invention.

FIG. 4 is a view showing a fourth embodiment of a color correction method according to the present invention including a second embodiment of a color correcting relation extracting method according to the present invention.

The second embodiment of a color correcting relation extracting method relates to a method of extracting a know-how for an image formation possessed by an operator of a scanner 100, and the fourth embodiment of a color correction method relates to a method of extracting the know-how in accordance with the second embodiment of a color correcting relation extracting method and performing a color correction using the extracted know-how.

According to the second embodiment of a color correcting relation extracting method, first, a general image 111, which is photographed on a reversal film 110 of a sort referred to as the "RV film A", and a color chart 112, are scanned by a scanner 100 so that the scanner 100 outputs image data representative of a printing dot % CMYK. Thus, the printing dot % CMYK is obtained.

An operator of the scanner 100 operates the scanner 100 so as to obtain the printing dot % CMYK corresponding to a preferable tone of color by a know-how through one's experience in accordance with a tone of color of the general image 111 formed on the reversal film 110. The image data representative of the printing dot % CMYK thus obtained is fed to a printing machine 120 so that an image, wherein the general image 111 is subjected to a color correction to a preferable tone of color, is printed on a printing matter 121.

Next, there is measured dye density CMY of each of patches 112a constituting the color chart 112 photographed on the reversal film 110.

In this manner, there is obtained a know-how 130 of converting dye densities CMY (RV) of the reversal film 110 into the printing dot % CMYK. The know-how 130 corresponds to one in which a know-how of an operator of the scanner 100 regarding an image formation, but depends on the color characteristic of the reversal film 110 and the printing condition. For this reason, according to the present embodiment, there are combined an RV device characteristic conversion 131 in which coordinate values Lab (RV) corresponding to a color of an image on the reversal film 110 are converted into dye density CMY (RV) of the reversal film 110, a know-how 130 in which the dye density CMY (RV) of the reversal film 110 is converted into the printing dot % CMYK, and a printing device characteristic conversion 132 in which the printing dot % CMYK is converted into coordinate values Lab (print) corresponding to a color of an image on the printing matter, so that a know-how, which is independent of the color characteristics of the reversal film 110 and the printing condition, can be obtained.

According to the second embodiment of a color correcting relation extracting method, as mentioned above, it is possible to extract the know-how for an image formation obtained through an experience of an operator of the scanner in such a manner that it is independent of the color characteristics of the reversal film 110 and the printing condition.

According to the fourth embodiment of a color correction method, there are combined a gamut mapping conversion 133, wherein coordinate values Lab (PCS) within the standard color reproducing area PCS are converted into coordinate values Lab (RV) within the color reproducing area of the reversal film, the know-how extracted in accordance with the second embodiment of a color correcting relation extracting method, and a gamut mapping conversion 134, wherein coordinate values Lab (printing) within the color reproducing area of the printing are converted into coordinate values Lab (PCS) within the standard color reproducing area, so that the know-how, which is extracted in accordance with the second embodiment of a color correcting relation extracting method, is modified. Thus, an LUT 140 corresponding to the know-how after the correction is generated and incorporated into the computer system 80.

With respect to the subsequent procedure, it is the same as the third embodiment of a color correction method, which is explained referring to FIG. 3, and thus the redundant explanation will be omitted.

As mentioned above, according to a color correcting relation extracting method of the present invention, it is possible to extract the above-mentioned know-how. And according to a color correction method of the present invention, it is possible to reproduce the know-how.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color correction method comprising:
   a color correction conversion definition producing step including a first partial step of obtaining image data outputted from an input device for receiving an original image and outputting the image data representative of a received image which is subjected to a color correction for the original image, a second partial conversion step of converting the image data obtained by said first partial step into coordinate values of a colorimetry color space describing a measured value of a color, corresponding to a color of an image obtained when the image based on the obtained image data is outputted from an output device for outputting the image based on the image data, in accordance with characteristics of an image output of the output device, and a third partial step for obtaining the coordinate values of the colorimetry color space corresponding to the color of the original image,
   whereby said color correction conversion definition producing step produces a color correction conversion definition defining an association between coordinate values of the colorimetry color space corresponding to colors before and after the color correction;
   a first device conversion step of using a conversion definition according to characteristics of image receipt or image output by a first device for receiving an image to obtain image data or outputting an image based on image data, to convert coordinate values in a first color space describing image data for the first device into coordinate values of the colorimetry color space independent of the device;
   a color correction conversion step of using the color correction conversion definition produced in said color correction conversion definition producing step to convert coordinate values of the colorimetry color space corresponding to colors before the color correction into coordinate values of the colorimetry color space corresponding to colors after the color correction; and
   a second device conversion step of using a conversion definition according to characteristics of image receipt or image output by a second device for receiving an image to obtain image data or outputting an image based on image data, to convert coordinate values of the colorimetry color space into coordinate values in a second color space describing image data for the second device,
   whereby the image data defined by the first color space is converted into image data defined by the second color space, said image data being representative of an image in which the color correction is applied to an image based on the image data defined by the first color space.

2. A color correction method according to claim 1 wherein said color correction conversion definition producing step produces, as said color correction conversion definition, a color correction conversion definition defining an association between coordinate values within an area of original image colors reproducible as colors of the original image of the colorimetry color space and coordinate values within an area of reproduced image colors reproducible as colors of the reproduced image of the colorimetry color space,
   before execution of the color correction conversion step, there is carried out a first gamut conversion step in which coordinate values within an area of colors reproducible as colors of an image received or outputted by the first device of the colorimetry color space are converted into coordinate values within the area of the original image colors, and
   after execution of the color correction conversion step, there is carried out a second gamut conversion step in which coordinate values within the area of the reproduced image colors are converted into coordinate values within an area of colors reproducible as colors of an image received or outputted by the second device of the colorimetry color space.

3. A color correction method according to claim 1, wherein said color correction conversion definition producing step produces, as said color correction conversion definition, a color correction conversion definition defining an association between coordinate values within a predetermined area of the colorimetry color space,
   before execution of the color correction conversion step, there is carried out a first gamut conversion step in which coordinate values within an area of color reproducible as colors of an image received or outputted by the first device of the colorimetry color space are converted into the coordinate values within the predetermined area, and
   after execution of the color correction conversion step, there is carried out a second gamut conversion step in which the coordinate values within predetermined area are converted into coordinate values within an area of colors reproducible as colors of an image received or outputted by the second device of the colorimetry color space.

4. A color correcting relation extracting method, comprising:
   measuring a color of a patch of a color chart to obtain a colorimetry value;
   photographing the color chart to obtain RGB data; and
   combining a know-how for converting the colorimetry value into the RGB data, with a monitor characteristic conversion for converting the RGB data into the colorimetry value of a color of an image on a monitor;
   wherein know-how for a preferable image formation is obtained.

* * * * *